H. B. JOHNSON.
REIN OPERATIVE CONTROL MEANS FOR MOTOR CARS.
APPLICATION FILED JULY 27, 1917.
1,300,618.
Patented Apr. 15, 1919.
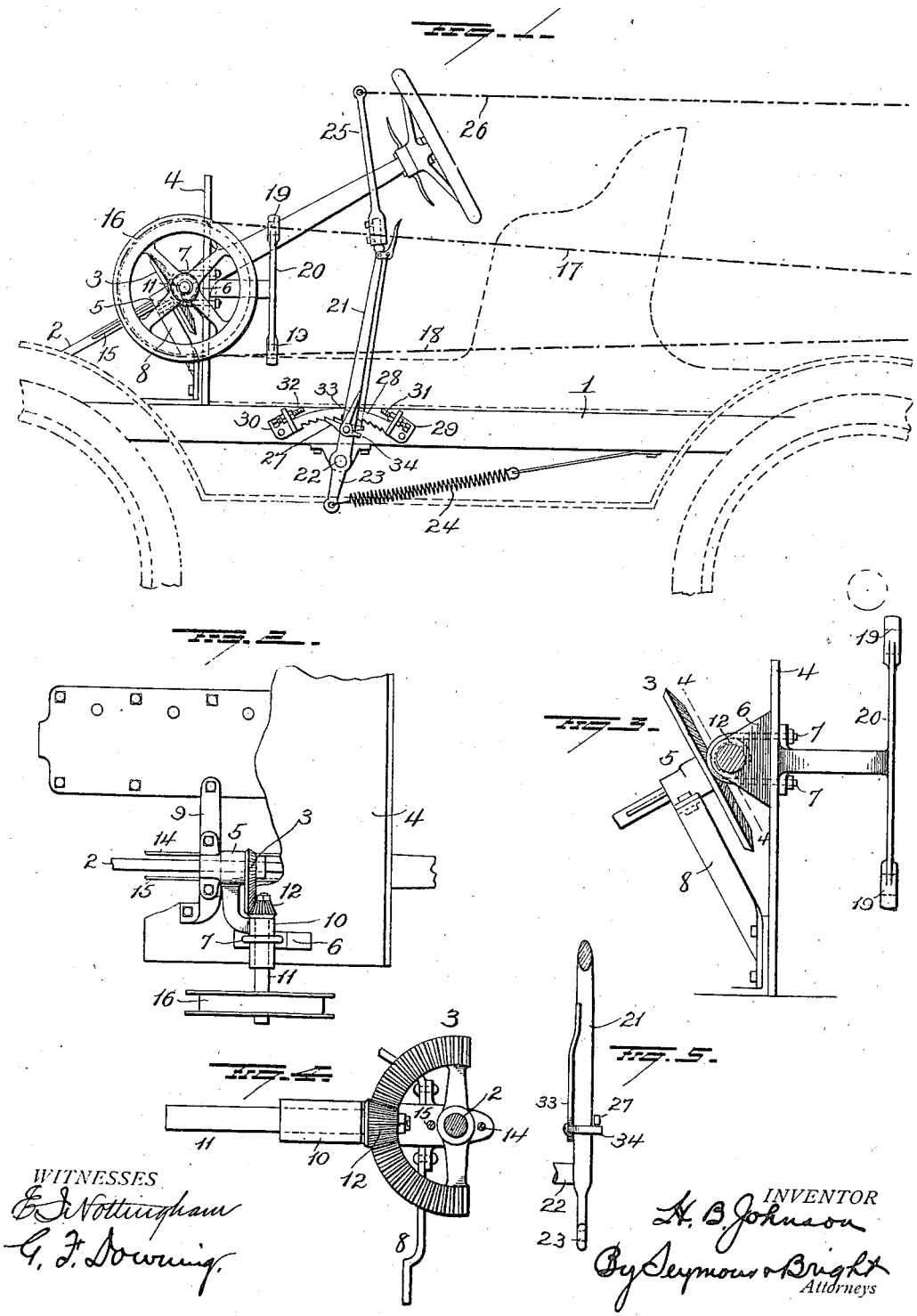

UNITED STATES PATENT OFFICE.

HOMER B. JOHNSON, OF SHERIDAN, INDIANA.

REIN-OPERATIVE CONTROL MEANS FOR MOTOR-CARS.

1,300,618.   Specification of Letters Patent.   Patented Apr. 15, 1919.

Application filed July 27, 1917. Serial No. 183,162. REISSUED

*To all whom it may concern:*

Be it known that I, HOMER B. JOHNSON, a citizen of the United States, and a resident of Sheridan, in the county of Hamilton and State of Indiana, have invented certain new and useful Improvements in Rein-Operative Control Means for Motor-Cars; and I do hereby declare the following to be a full, clear, and exact description of the invention, such as will enable others skilled in the art to which it appertains to make and use the same.

This invention relates to improvements in rein-operative control means for motor cars,—one object of the invention being to provide simple and efficient means whereby an automobile may be utilized as a farm tractor in supplying draft means for agricultural implements, such as plows, cultivators and harrows.

A further object is to provide means which may be readily applied to an automobile of standard construction, to facilitate the control of the same from a position in rear thereof, as from the operator's seat of a riding plow.

With these and other objects in view, the invention consists in certain novel features of construction and combinations of parts as hereinafter set forth and pointed out in the claims.

In the accompanying drawings, Figure 1 is an elevation showing a portion of an automobile of the "Ford" type and illustrating the application of my improvements. Figs. 2 and 3 are detailed views illustrating the steering devices. Fig. 4 is a sectional view on the line 4—4 of Fig. 3, and Fig. 5 is a detail view of a portion of the control devices.

1 represents an automobile which may be of the "Ford" or other type, but for convenience I have shown and will describe my improvements as applied to a Ford automobile.

To the steering shaft 2, a segmental gear 3 is secured at a point near the dash 4 of the car. A bracket 5 is located adjacent to the segmental gear 3 and is spaced from the forward side of the dash 4 by means of a block 6,—said bracket being secured to the dash by means of a U-bolt 7 and it is also connected with the dash by means of a brace 8. A brace 9 may also be employed to connect the bracket 5 with a stationary part of the machine, as with the engine casing as shown in Fig. 2. The bracket 5 is constructed to permit the free passage of the steering shaft 2 and it is also provided with a bearing 10 for a shaft 11 which carries a pinion 12 to mesh with the segmental gear 3,—said bracket 5 being thus formed to maintain the shaft 11 at right angles to the steering shaft 2 and the pinion 12 in proper mesh with the segmental gear 3. This segmental gear is of open construction so as to permit the same to be oscillated without interfering with the rods 14—15 which pass through the same and control the throttle and the spark of the engine respectively.

The short shaft 11 carries a pulley 16, about which two cables or reins 17 and 18 are wound respectively in opposite directions and may be secured to said pulley. These cables or reins are guided through loops or eyes 19 of a guide bracket 20,—the latter being located in rear of the dash 4 and held in place by means of the U-bolt 7 said reins extending rearwardly to a position within convenient reach of an operator who may be riding upon the seat of a riding plow connected with the automobile in any suitable manner.

The control lever 21 of the car is pivotally supported at 22 and its lower short arm 23 is connected, by means of a spring 24 with a stationary part of the machine. An extension arm 25 is removably attached to the handle portion of the control lever 21 and to the upper end of said extension arm, one end of a cable 26 is attached,—said cable being extended rearwardly to a position within convenient reach of the operator on the plow. The control lever 21 carries a pawl 27 to engage the teeth of a stationary rack or segment 28 and at respective ends of said segment brackets 29 and 30 are located for the accommodation of adjustable stops 31—32. An L-shaped trip lever 33 is pivotally mounted on the control lever 21 in proximity to the pawl 27 and is provided with a toe 34 to engage the heel of said pawl.

It is apparent that when one of the cables 17 or 18 is pulled by the operator, motion will be transmitted by the gearing above described to the steering shaft 2 and in this manner the direction of travel of the car may be readily controlled by the operator from his seat on the plow. When the cable 26 is pulled by the operator, the control lever 21 will be moved rearwardly with the result of applying the brake and pulling out the clutch as is well understood in the operation of a Ford car. When the lever 21 approaches the end of its rearward throw, the trip lever 33 will engage the stop screw 31 and be moved in a direction to cause the toe 34 to engage the heel of the pawl 27 and move the latter out of engagement with the teeth of segment 28. The spring 24 will now operate to move the control lever 21 forwardly to release the brake and throw in the clutch. As the lever 21 approaches the end of its forward throw, the trip lever 33 will engage the stop 32, causing said trip lever to be turned to release the pawl 27, when said control lever may be controlled as in the normal operation of the car. The trip lever will be retained in the position to which it may be moved by the stops, by engagement with the lever 21, as illustrated in Fig. 5.

I do not claim herein the features of the control lever construction, the same being embodied in a divisional application filed by me on the 5th day of April, 1918, and designated by Serial No. 226,889.

Various slight changes might be made in the details of construction of my invention without departing from the spirit thereof or limiting the scope and hence I do not wish to restrict myself to the precise details herein set forth.

Having fully described my invention what I claim as new and desire to secure by Letters-Patent, is:

1. Steering means for an automobile, comprising a bracket adapted to be secured in place forwardly of the dash-board of the automobile and adapted for the free passage of the steering shaft of the machine, a gear adapted to be secured to the steering shaft adjacent to said bracket, a short shaft mounted in said bracket, a pinion on said short shaft to mesh with said gear, an operating member secured to said short shaft, and reins secured to said operating member and adapted to extend rearwardly of the automobile.

2. The combination with the steering shaft of an automobile and a gear secured thereto, of a short shaft, means for supporting said shaft, a pinion carried by the short shaft and meshing with the gear on the steering shaft, a pulley on the short shaft, and manually operable reins passing about said pulley for turning said short shaft to impart motion to the steering shaft.

3. The combination with the steering shaft of an automobile and a gear secured thereto, of a bracket secured to the machine, a short shaft mounted in said bracket and carrying a pinion meshing with said gear, a pulley on said short shaft, reins for turning said pullley and short shaft in one direction or the other, and a guide bracket in rear of the dash of the automobile and through which said reins pass.

In testimony whereof, I have signed this specification in the presence of two subscribing witnesses.

HOMER B. JOHNSON.

Witnesses:
W. O. FIFER,
WILL HARRISON.